United States Patent
Nakata

(10) Patent No.: US 7,496,290 B2
(45) Date of Patent: Feb. 24, 2009

(54) MULTIPOINT AUTOFOCUS SYSTEM AND CAMERA HAVING MULTIPOINT AUTOFOCUS SYSTEM

(75) Inventor: Masahiro Nakata, Saitama (JP)

(73) Assignee: Hoya Corporation, Tokyo (JP)

( * ) Notice: Subject to any disclaimer, the term of this patent is extended or adjusted under 35 U.S.C. 154(b) by 373 days.

(21) Appl. No.: 11/264,038

(22) Filed: Nov. 2, 2005

(65) Prior Publication Data

US 2006/0120711 A1    Jun. 8, 2006

(30) Foreign Application Priority Data

Nov. 16, 2004  (JP)  .............................. 2004-332358

(51) Int. Cl.
  *G03B 3/10*  (2006.01)
  *G03B 13/34*  (2006.01)
(52) U.S. Cl. ...................................... 396/123; 348/349
(58) Field of Classification Search ................. 396/123; 348/349
  See application file for complete search history.

(56) References Cited

U.S. PATENT DOCUMENTS 5,041,859 A * 8/1991 Ishiguro et al. ............. 396/123
6,115,553 A    9/2000 Iwamoto
6,859,619 B2   2/2005 Kurosawa

FOREIGN PATENT DOCUMENTS

| JP | 2002-072069 | 3/2002 |
| JP | 2002-131621 | 5/2002 |
| JP | 2002-323650 | 11/2002 |

OTHER PUBLICATIONS

English Language Abstract of JP 2002-323650.
English Language Abstract of JP 2002-072069.
English Language Abstract of JP 2002-131621.

* cited by examiner

*Primary Examiner*—Patrick J Assouad
*Assistant Examiner*—Autumn Parker
(74) *Attorney, Agent, or Firm*—Greenblum & Bernstein, P.L.C.

(57) ABSTRACT

A multipoint autofocus system in which a pair of object images, obtained by pupil-division of an object light bundle in each detection area, are projected onto different zones of a sensor and are converted into image signals, so that a defocus amount can be determined based on the image signals, the multipoint autofocus system including intersecting detection areas whose detection areas partly overlap and a plurality of sensor arrays of the sensor corresponding to respective the intersecting detection areas; and a selection device for selecting a defocus amount whose absolute value is smallest out of defocus amounts obtained by each sensor array of the intersecting detection areas.

20 Claims, 7 Drawing Sheets

MULTIPOINT AUTOFOCUS SYSTEM AND CAMERA HAVING MULTIPOINT AUTOFOCUS SYSTEM

BACKGROUND OF THE INVENTION

1. Field of the Invention

The present invention relates to a multipoint autofocus system which is capable of focusing on any object in a plurality of focus detection zones and a camera having such a multipoint autofocus system.

2. Description of the Related Art

In a single-lens reflex camera, it is common for a multipoint autofocus system, which is capable of focusing on a plurality of focus detection zones, to be provided. In a known pupil-division phase difference multipoint autofocus system provided in a single-lens reflex camera, a pair of object images obtained by pupil division are projected onto a line sensor array so that the defocus amount can be obtained based on a phase difference between the pair of object images formed on the line sensor array.

In recent years, a multipoint autofocus system having a cross sensor in which the defocus amount of object images in the same focus detection zone is detected by lateral line sensor arrays and longitudinal line sensor arrays has been proposed. For example, see Japanese Unexamined Patent Publication No. 2002-323650.

In an automatic selection of focus detection zones in a multipoint autofocus system, in many cases, a closest object is preferentially selected. If the focus detection is carried out by the cross sensor consisting of lateral and longitudinal line sensor arrays, either the lateral line sensor arrays or the longitudinal line sensor arrays may be theoretically focused because the focus detection is carried out for the same object.

However, if the object in one of the lateral and longitudinal line sensor arrays has a low contrast or contrast gradation, there is a possibility of failure to correctly detect a phase difference. If the phase difference is deviated on the short object distance side, the focusing lens is moved in the direction of the short object distance, thus resulting in AF hunting.

SUMMARY OF THE INVENTION

The present invention eliminates the drawbacks of the prior art mentioned above, by providing a multipoint autofocus system having intersecting focus detection areas in which a failure to correctly detect the focus is reduced; and accordingly, the movement of the focusing lens group due to the detection failure is minimized.

According to an aspect of the present invention, a multipoint autofocus system is provided, in which a pair of object images, obtained by pupil-division of an object light bundle in each detection area, are projected onto different zones of a sensor and are converted into image signals, so that a defocus amount can be determined based on the image signals, the multipoint autofocus system including intersecting detection areas whose detection areas partly overlap and a plurality of sensor arrays of the sensor corresponding to respective the intersecting detection areas; and a selection device for selecting a defocus amount whose absolute value is smallest out of defocus amounts obtained by each sensor array of the intersecting detection areas.

It is desirable for the intersecting detection areas to include two pairs of areas which intersect at an optional angle and two pairs of corresponding the sensor arrays.

The multipoint autofocus system can include a reliability judging device for determining the reliability of the image signals obtained from the sensor arrays corresponding to the intersecting detection areas. The selection device performs a selecting operation for a low-reliability defocus amount, corresponding to a intersecting detection area whose reliability has been judged to be low by the reliability judging device, and remaining defocus amounts, after the low-reliability defocus amount is substituted with a predetermined value.

In the case where the reliability judging device judges that the reliability of the image signals obtained from all the sensor arrays corresponding to the intersecting detection areas is low, it is desirable for the defocus amount not to be substituted.

It is desirable for the reliability to be determined based on whether the object images projected onto the sensor arrays has a low contrast or contrast gradation.

In the case where one of the intersecting detection areas is selected, it is desirable for the selection device to perform a selecting operation for the defocus amount obtained from the sensor array of the selected intersecting detection area.

In the case where the absolute values of the defocus amounts are substantially identical or a difference between the absolute values of the defocus amounts is within a predetermined range, it is desirable for the selection device to select the defocus amounts of the sensor arrays corresponding to the lateral detection areas.

In an embodiment, a multipoint autofocus system is provided, in which a pair of object images, obtained by pupil-division of an object light bundle in each detection area, are projected onto different zones of a sensor and are converted into image signals, so that a defocus amount can be determined based on the image signals, the multipoint autofocus system including intersecting detection areas whose detection areas partly overlap and a plurality of sensor arrays of the sensor corresponding to respective the intersecting detection areas; and a selection device for selecting a defocus amount corresponding to the shortest object distance.

In an embodiment, a multipoint autofocus system is provided, in which a pair of object images, obtained by pupil-division of an object light bundle transmitted through an optical system including a focusing lens group in each detection area, are projected onto different zones of a sensor and are converted into image signals, so that an amount of movement of the focusing lens group can be determined based on the image signals, the multipoint autofocus system including intersecting detection areas whose detection areas partly overlap and a plurality of sensor arrays of the sensor corresponding to respective the intersecting detection areas; and a selection device for selecting the smallest amount of movement of the focusing lens group, from among the movement amounts of the focusing lens group obtained by the sensor arrays corresponding to the intersecting detection areas.

In an embodiment, a camera having a multipoint autofocus system is provided, in which a pair of object images, obtained by pupil-division of an object light bundle in each detection area, are projected onto different zones of a sensor and are converted into image signals, so that a defocus amount can be determined based on the image signals, the multipoint autofocus system including intersecting detection areas whose detection areas partly overlap and a plurality of sensor arrays of the sensor corresponding to respective the intersecting detection areas; and a selection device for selecting a defocus amount whose absolute value is smallest out of defocus amounts obtained by each sensor array of the intersecting detection areas.

In an embodiment, a camera having a multipoint autofocus system is provided, in which a pair of object images, obtained by pupil-division of an object light bundle in each detection area, are projected onto different zones of a sensor and are converted into image signals, so that a defocus amount can be determined based on the image signals, the multipoint autofocus system including intersecting detection areas whose detection areas partly overlap and a plurality of sensor arrays of the sensor corresponding to respective the intersecting detection areas; and a selection device for selecting a defocus amount corresponding to the shortest object distance.

In an embodiment, a camera having a multipoint autofocus system is provided, in which a pair of object images, obtained by pupil-division of an object light bundle transmitted through an optical system including a focusing lens group in each detection area, are projected onto different zones of a sensor and are converted into electrical image signals, so that an amount of movement of the focusing lens group can be determined based on the image signals, the multipoint autofocus system including intersecting detection areas whose detection areas partly overlap and a plurality of sensor arrays of the sensor corresponding to respective the intersecting detection areas; and a selection device for selecting the smallest amount of movement of the focusing lens group, from among the movement amounts of the focusing lens group obtained by the sensor arrays corresponding to the intersecting detection areas.

The present disclosure relates to subject matter contained in Japanese Patent Application No. 2004-332358 (filed on Nov. 16, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
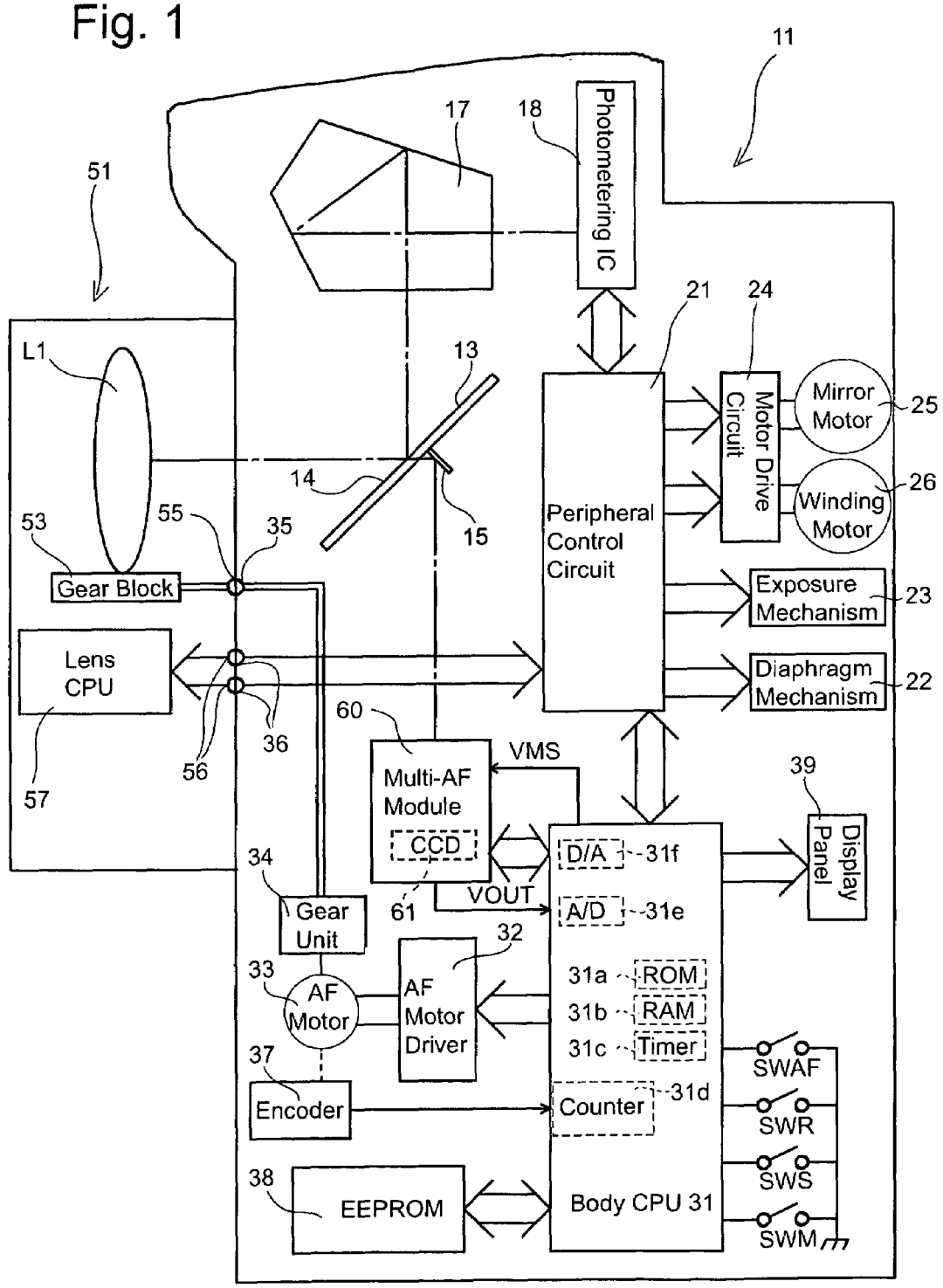
FIG. 1 is a block diagram of the main components of a single-lens reflex camera according to an embodiment of the present invention.

FIG. 1 shows a block diagram of the main components of an AF single-lens reflex camera to which an embodiment of the present invention is applied. The AF single-lens reflex camera includes a camera body 11 having incorporated therein a multi-AF module (multipoint focus detection module) 60 with a CCD focus detection element 61, as a focus detection element, and an AF photographing lens 51 detachably attached to the camera body 11. The camera body 11 includes a body CPU 31 which generally controls the camera body 11 and the photographing lens 51, and which functions also as a selection device, a discrimination device, and a reliability judging device.

The photographing lens 51 is provided with a lens CPU 57 which controls the lens function. The camera body 11 includes a peripheral control circuit 21 which receives and transmits lens data and AF lens driving data, etc., from and to the lens CPU 57 provided in the photographing lens 51.

A large part of an object light bundle incident upon the camera body 11 from the photographing lens 51 is reflected by a main mirror 13 toward a pentagonal prism 17, which constitutes a finder optical system, is reflected by the pentagonal prism 17 and is emitted from an eyepiece (not shown). Part of the object light emitted from the pentagonal prism is incident upon a light receiving element of a photometering IC 18. The light bundle incident upon a half mirror 14 formed at the central portion of the main mirror 13 is transmitted through the half mirror 14 and is reflected downward toward the multi-AF module 60 via a sub-mirror 15 formed at the rear surface of the main mirror 13.

The photometering IC 18 converts the received light into electric signals corresponding to the quantity of light and outputs the electric signals, as the brightness signals, to the body CPU 31 through the peripheral control circuit 21. The body CPU 31 performs an exposure calculation, based on the brightness signal and the film sensitivity data, etc., and calculates an appropriate shutter speed and a diaphragm value for exposure. Upon a photographing operation, the peripheral control circuit 21 drives a mirror motor 25 through a motor drive circuit 24 to move the main mirror upward and drives the diaphragm mechanism 22 to thereby set the diaphragm (not shown) of the photographing lens 51 to the calculated diaphragm value, in accordance with the shutter speed and the diaphragm value obtained by the above-mentioned calculation. Consequently, the exposure mechanism (focal plane shutter) 23 is driven based on the calculated shutter speed to perform the exposure operation. After the exposure operation is completed, the peripheral control circuit 21 drives the mirror motor 25 to move the main mirror 13 downward and drives a film winding motor 26 to wind a film 1 by one frame.

The body CPU 31 includes a ROM 31a in which control program, etc., is stored, a RAM 31b in which data for calculation and control is temporarily stored, a timer 31c, a counter 31d, an A/D converter 31e which A/D-converts the output signal VOUT (integration completion signal/video signal Video) input from the multi-AF module 60 (CCD focus detection element 61) into digital signals, and a D/A converter 31f which converts the monitor reference signal VMS into analogue signals and outputs the analogue signals. Furthermore, the body CPU 31 is connected to an EEPROM 38$_{[a1]}$ which is an external nonvolatile memory device. The EEPROM 38 stores therein various constants inherent to the camera body 11.

The multi-AF module 60 uses a pupil division phase difference method for focus detection, and includes a CCD focus detection element 61 having a plurality of line sensor arrays, and an AF optical system (not shown), in which an object light bundle forming object images in a plurality of focus detection areas is pupil-divided into two light bundles on a focus detection surface equivalent to an image pickup surface and is projected onto the corresponding line sensor arrays.

The CCD focus detection element 61 is provided with the plurality of line sensor arrays which receive and integrate the pair of pupil-divided object light bundles, and a monitor sensor which monitors the quantity of light received by each line sensor array, i.e., the monitor sensor checks the integrated value. The operation of each line sensor array and the monitor sensor is controlled by a control circuit of the CCD focus detection element 61. When the monitored voltage (output voltage) of the monitor sensor reaches a predetermined threshold value, control circuit (of the CCD focus detection element 61) stops the integral operation of the line sensor array corresponding to the monitor sensor. When the integral operation of all the line sensor arrays is completed, the charges obtained by the integral operation are successively converted into voltage as pixel units for each line sensor array and are output, into video signals Video as pixel units, to the body CPU 31.

Figure 2:
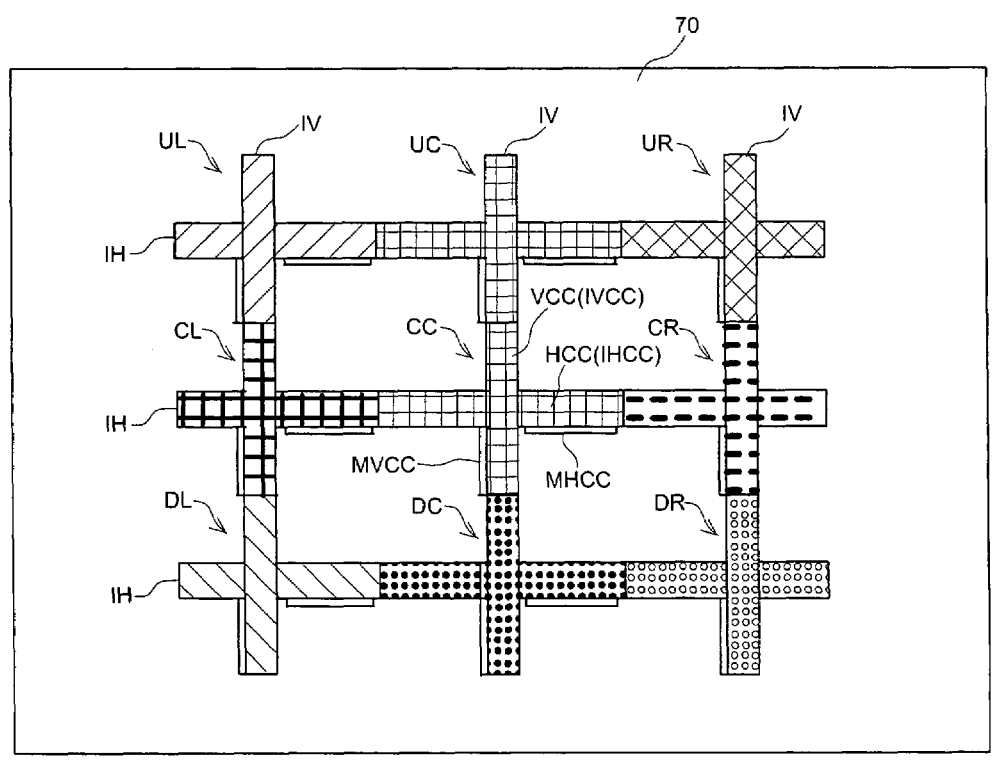
FIG. 2 is a schematic view of an arrangement of line sensor arrays of the embodiment shown in FIG. 1.
Figure 3:
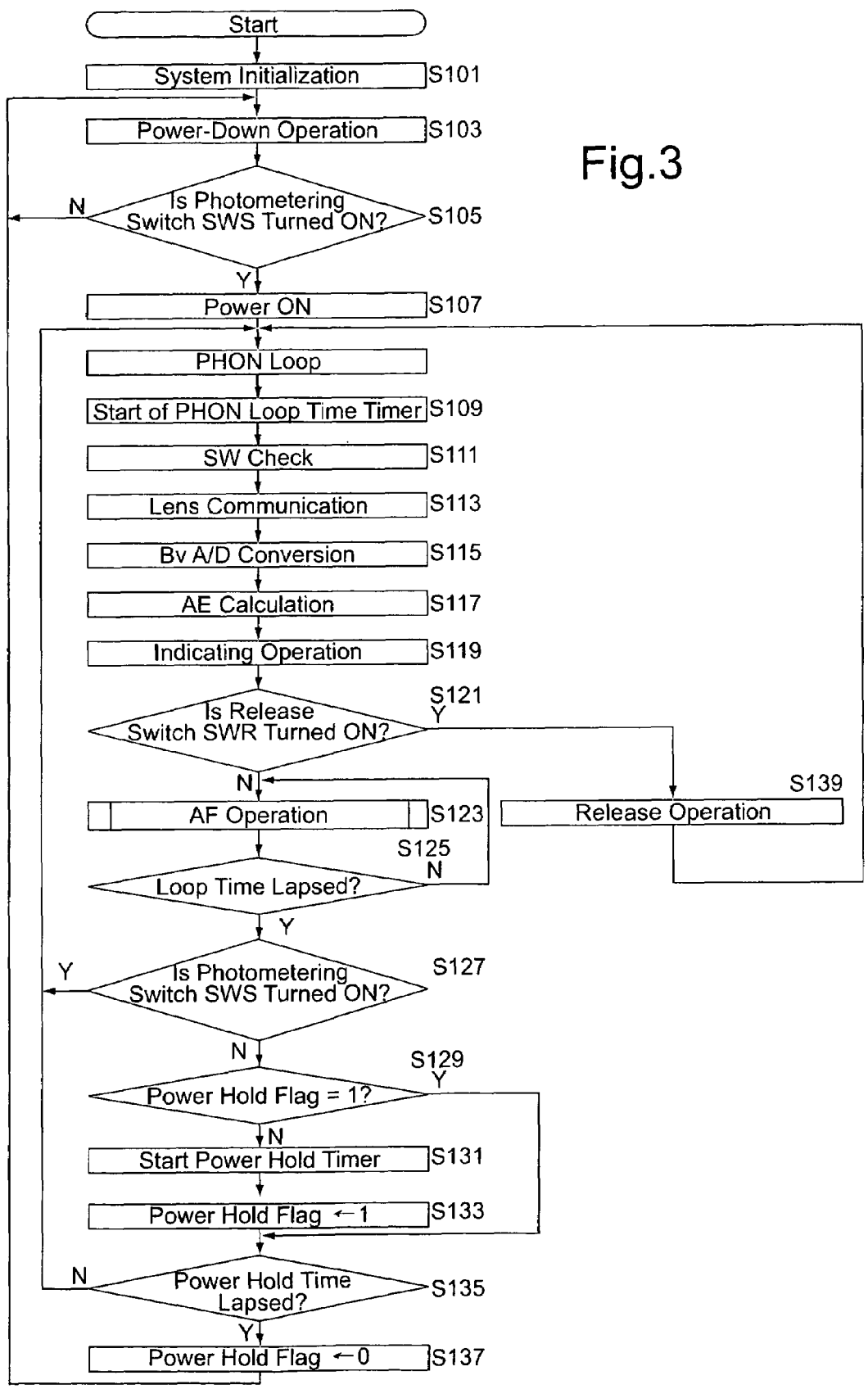
FIG. 3 is a flow chart of a main operation of the embodiment shown in FIG. 1.

FIG. 2 schematically shows a relationship between an image plane 70 and the CCD focus detection element 61 by way of example. In this embodiment, there are nine intersecting detection areas UL, UC, UR, CL, CC, CR, DL, DC, DR within the image plane 70. The line sensor arrays consisting of the longitudinal sensors IV and the lateral sensors IH are provided corresponding to the intersecting detection areas UL through DR.

The longitudinal sensor IVCC and the lateral sensor IHCC corresponding to the central cross detection area CC (longitudinal detection areas VCC and lateral detection areas HCC) are respectively divided into two areas, i.e., a reference area and a standard area, so that one of the split object images is projected onto each area and the pixels (photoelectric transducers) of the respective areas are integrated, i.e., are converted into electric charges corresponding to the illuminance of the object image. The charges are accumulated as electric signals. Upon completion of the integral operation, the signals are output as video signals (image signals) Video for each pixel and each sensor. Monitor sensors MVCC and MHCC are provided adjacent to the standard areas of the longitudinal sensors IVCC and the lateral sensors IHCC. The monitor sensors MVCC and MHCC monitor the quantity of light received by the adjacent lateral and longitudinal sensors IVCC and IHCC and output monitor signals (voltages).

All of the cross detection areas UL through DR in the illustrated embodiment correspond to the longitudinal sensors IV and the lateral sensors IH, which are identical in structure to the longitudinal and lateral sensors IVCC and IHCC of the central cross detection area.

The CCD focus detection elements 61 output the monitor signals (monitor voltages) repeatedly at a predetermined cycle for each line sensor array, instead of the video signals Video from the same output port (VOUT) until the integral operations of all the longitudinal and lateral sensors IV and IH are completed. An integration completion signal is output when the integral operation of a longitudinal sensor IV and a lateral sensor IH is completed. When the integral operations of all the longitudinal and lateral sensors IV and IH are completed, the charges obtained by the integral operations of all the longitudinal and lateral sensors IV and IH are sequentially converted into predetermined video signals Video to be output.

Note that although in the illustrated embodiment the cross detection areas UL, UC, UR, CL, CC, CR, DL, DC, DR are each provided with two areas which are substantially perpendicular to each other, these areas do not necessary have to be perpendicular to each other.

The body CPU 31 converts the video signals Video input from the multi-AF module 60 into digital signals in the A/D converter 31e incorporated in the body CPU 31, and performs a predetermined calculation (predicting calculation) based on the digital signals corresponding to the focus detection areas to obtain a defocus amount. The rotational direction of the AF motor 33 is determined based on the calculated defocus amount. The number of revolutions of an AF motor is determined based on the number of AF pulses output from an encoder 37 and this number is set in the counter 31d incorporated in the body CPU 31. The body CPU 31 drives the AF motor 33 via an AF motor driver 32, based on the direction and the number of pulses. When the AF motor 33 is driven, the body CPU 31 counts down the number of pulses output from the encoder 37 in association with the rotation of the AF motor 33, using a built-in counter 35d. When the counted value becomes zero, the AF motor 33 is stopped.

The rotation of the AF motor 33 is reduced by a gear block 34 and is transmitted to the photographing lens 51 through the connection between a joint 35 provided on the body mount of the camera body 11 and a lens joint 55 provided on the lens mount of the photographing lens 51.

A focus switch SWAF which is adapted to switch the focus mode between a manual mode and an AF mode (one shot/continuous AF mode), a photometering switch SWS which is turned ON when a manual release button is depressed by half step, a release switch SWR which is turned On when the manual release button is depressed by full step, and a main switch SWM for controlling the power supply to the peripheral control circuit 21, are connected to the body CPU 31.

The body CPU 31 indicates the current mode such as an AF mode, an exposure mode or a photographing mode, the shutter speed, and the diaphragm value, etc., in a display panel 39. The display panel 39 includes indicators usually provided on the outer surface of the camera body 11 and the field of view finder.

The photographing lens 51 includes the lens CPU 57, a gear block 53 to move a focusing lens 52 in the axial direction, and the lens joint 55 which is provided on the lens mount of the photographing lens 51 and which is disconnectably connected to the body joint 35 of the camera body 11. The rotation of the AF motor 33 is transmitted to the gear block 53 through the gear block 34, the body joint 35 and the lens joint 55, so that the focusing lens group L1 can be moved through the gear block 53.

The lens CPU 57 is connected to the peripheral control circuit 21 of the camera body 11 through connection between the groups of electrical contacts 56 and 36, so that predetermined data communication can be carried out to transmit and receive information regarding full aperture, the maximum F value, focal length, and the lens position (object distance).

The multipoint autofocus operation in the illustrated embodiment is carried out as follows. When the photometering switch SWS is depressed by a half step, the integral operations are performed for the longitudinal and lateral sensors IV and IH of all the cross detection areas and the video signals Video are input to calculate the defocus amounts for all the cross detection areas. The defocus amount having the smallest absolute value is selected and the focusing operation is performed in accordance with the selected defocus amount.

In the illustrated embodiment, if the reliability of the video signal Video obtained from the longitudinal and lateral sensors is low, i.e., for example, if the contrast is low or contrast gradation is such that the brightness changes gradually or stepwise, the absolute value of the defocus amount based on the video signal Video is replaced with a preset value and the defocus amount having the smallest absolute value is selected.

If the cross detection area is selected, the above-mentioned operations are carried out in accordance with the video signals Video obtained from the longitudinal and lateral sensors of the selected cross detection area.

The automatic focus detection and the focusing operation of the AF single-lens reflex camera of the illustrated embodiment will be discussed below with reference to the flow charts shown in FIGS. 3 through 6. When a battery (not shown) is loaded in the camera body 11 and the main switch SWM is turned ON, control enters the routine shown in FIG. 3. The body CPU 31 performs the initialization of the system to generally control the camera operation at step S101. The system initialization includes starting the operation of the body CPU 31, reading the micro program from the ROM 31a, and initializing the cache, the input/output port and flags, etc. Thereafter, the operations from step S103 to step S139 are carried out while a predetermined value of voltage is applied from the battery.

Firstly, a power-down operation is performed to stop power supply to all components other than the body CPU 31 (step S103). Thereafter, whether or not the photometering switch SWS is turned ON is checked (step S105). If the photometering switch is not ON (step S105, N), the power-down operation is carried out (step S103), and the power-down state is maintained. If the photometering switch SWS is turned ON (step S105, Y), the power supply is turned ON (step S107), and control enters the PHON loop. The power-on operation (step S107) is carried out to supply the battery power to all the members including the body CPU 31. As a result, the photographing mode is indicated in, for example, the display panel 39.

<PHON Loop>

In the PHON loop (steps S109-S127), the PHON loop time timer is started (step S 109). The PHON loop time corresponds to an interval at which mainly the AF operations are repeated. Thereafter, the switch checking operation is performed, i.e., the state of each switch is input and the lens communication is carried out to obtain lens data from the photographing lens 51 (step S 113).

The object brightness signal By obtained by the photometering IC 18 is input from the peripheral control circuit 21 and is A/D-converted (step S115), and an AE calculation operation is carried out by an algorithm corresponding to the selected exposure mode (step S117) to determine the shutter speed and the diaphragm value, which are indicated in the display panel 39 (step S119).

Thereafter, whether or not the release switch $SWR_{[a2]}$ is turned ON is checked (step S121). If the release switch SWR is ON (step S121, Y), the release operation is performed (step S139), and control is returned to the operation of the PHON loop. If the release switch SWR is not ON (step S121, N), the AF operations are repeated until the loop time lapses (step S123; S125, N). When the loop time has lapsed (step S125, Y), it is determined whether or not the photometering switch SWS is turned ON (step S127). If the photometering switch SWS is ON (step S127, Y), control is returned to the first step of the PHON loop.

If the photometering switch SWS is not turned ON (step S127, N), it is determined whether or not the power hold flag is "1" (step S129). If the power hold flag is not "1", the power hold timer is started (step S131), the power hold flag is set to "1" (step S133), and control proceeds to step S135. If the power hold flag is "1" (step S129, Y), control skips steps S131 and S133 and proceeds to step S135.

At step S135, it is determined whether the power hold time has lapsed. If the power hold time has lapsed (step S135, Y), the power hold flag is set to "0" (step S137), and control is returned to step S103. If the power hold time has not lapsed (step S135, N), control is directly returned to the first step of the PHON loop. In other words, the operations from step S109 to step S135 are repeated until the power hold time, from when the photometering switch SWS is turned OFF, lapses. If the power hold time has lapsed after the photometering switch SWS has been turned OFF, the power hold flag is set to "0", and control is returned to step S103 to carry out the power-down operation. In the power-down state, no operation is carried out until the photometering switch SWS is turned ON (step S105).

Figure 4:
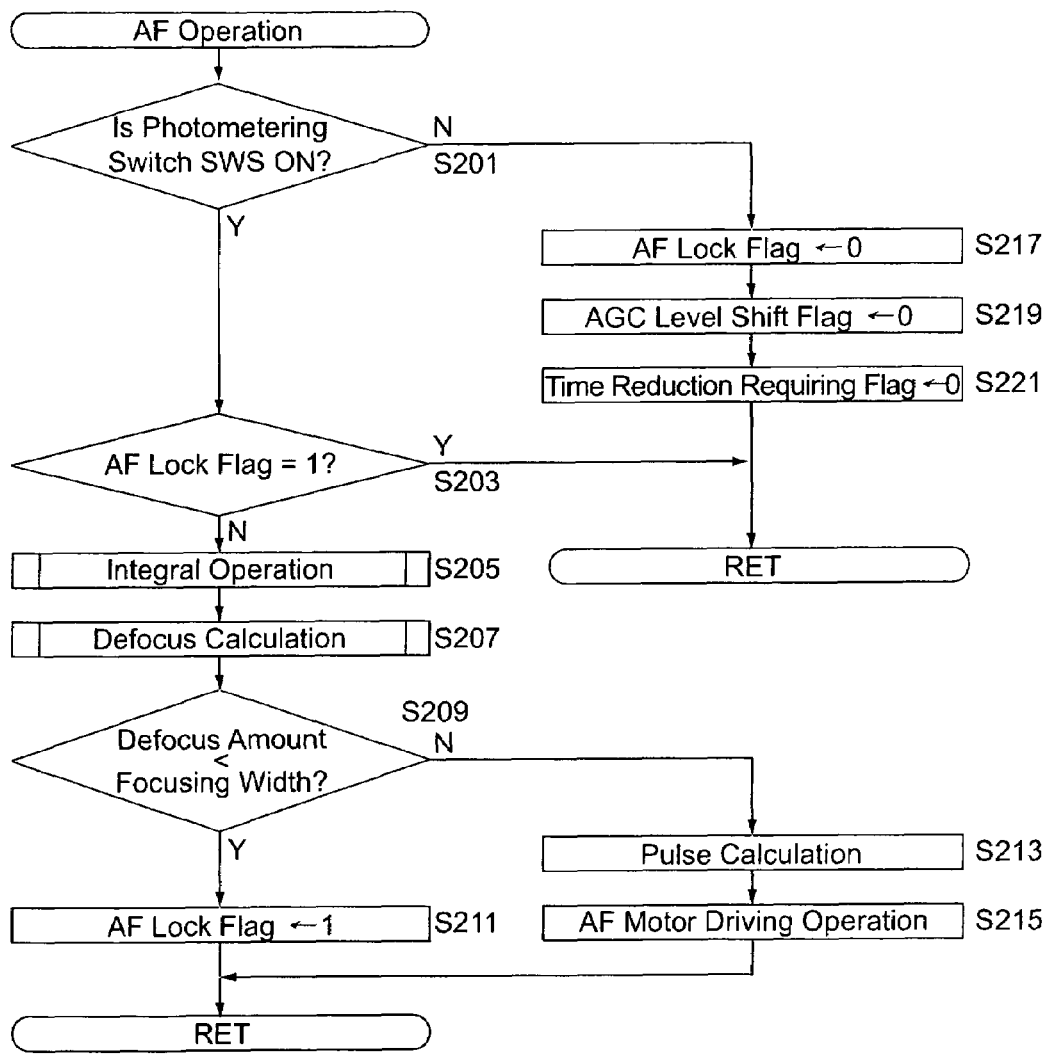
FIG. 4 is a flow chart of an AF operation in the embodiment shown in FIG. 1.

The AF operation at step S123 will be explained below with reference to the flow chart shown in FIG. 4. In the AF operation routine, it is determined whether or not the photometering switch SWS is turned ON (step S201). If the photometering switch SWS is OFF (step S201, N), the AF lock flag, the AGC level shift flag and the time reduction requirement flag are all set to "0" (steps S217, S219, S221). Thereafter, control is returned (RET).

If the photometering switch SWS is ON (step S201, Y), it is determined whether or not the AF lock flag is "1" (step S203). The AF lock flag is set to "1" to maintain an in-focus state when the optical system is focused in a one-shot AF mode.

If the AF lock flag is not "1" (step S203, N), the CCD focus detection element 61 performs the integral operation (step S205) and the video signal Video is input from the CCD focus detection element 61 to carry out the defocus calculation operation (step S207). Thereafter, it is determined whether or not the calculated defocus amount (absolute value) is within a focusing width (step S209). The focusing width refers to a range of the defocus amount in which the focus state can be considered "in-focus" in view of the depth of focus. The focusing width can be defined by a constant value or can be set by calculation based on the focal length the open diaphragm value input from the photographing lens.

If the defocus amount is not within the focusing width (step S209, N), the number of pulses necessary to drive the AF motor 33 is calculated in accordance with the defocus amount (step S213), and the AF motor is driven (step S215) and control is returned (RET).

If the defocus amount is within the focusing width (step S209, Y), the AF lock flag is set to "1" (step S211), and control is returned (RET). Once the AF lock flag is set to "1", control is returned from S203 if control re-enters the AF operation routine.

<Integral Operation>

Figure 5:
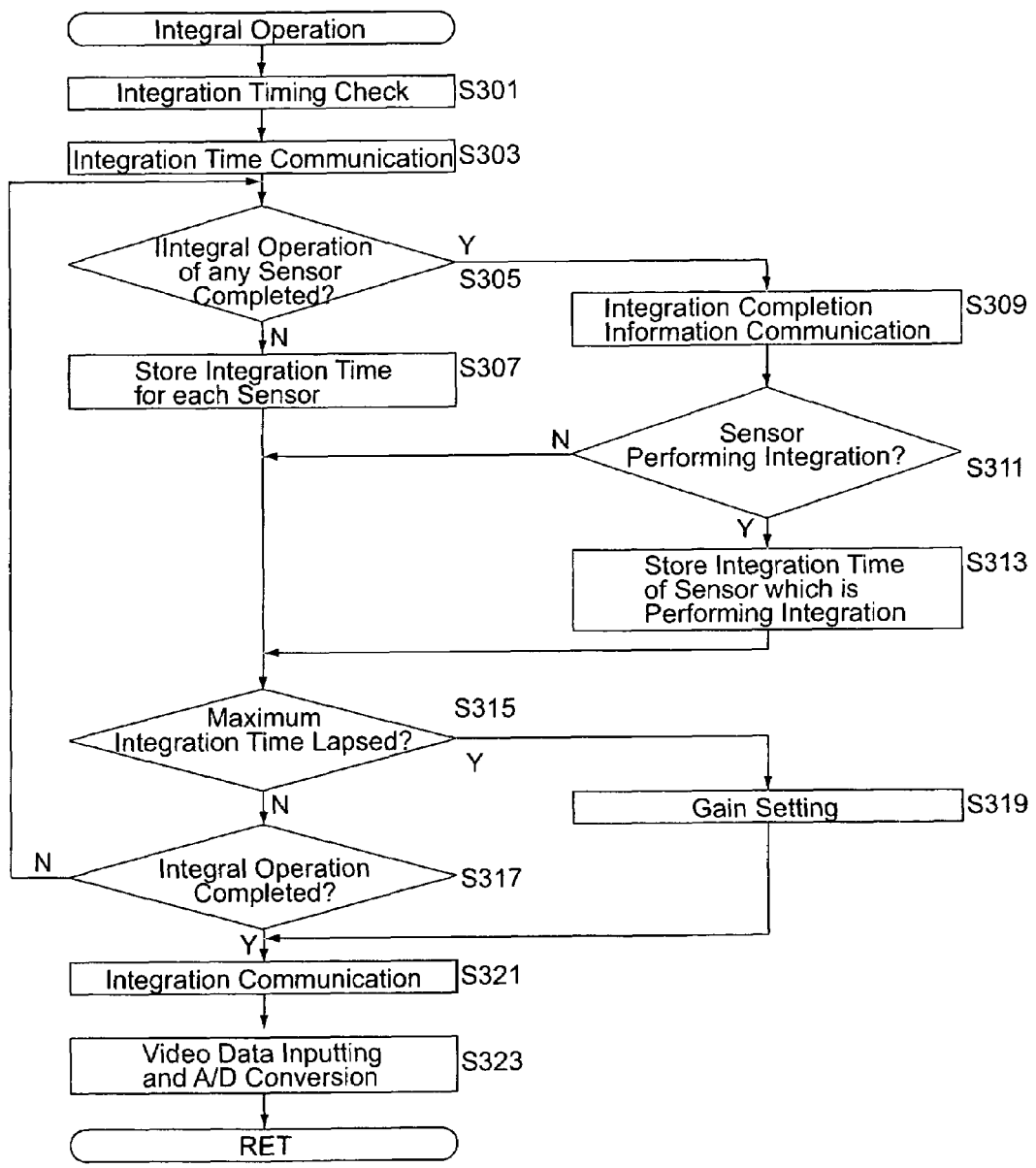
FIG. 5 is a flow chart of an integration operation in the AF operation shown in FIG. 4.

The integral operation will be discussed below with reference to the flow chart shown in FIG. 5. In the integral operation, the integration timing checking operation is carried out to determine the time at which the integration begins (step S301), and the integration start communication operation is carried out for the CCD focus detection element 61 (step S303). Subsequently, the CCD focus detection element 61 performs the integral operation of the longitudinal and lateral sensors IV and IH, and the monitor sensor M.

Whether or not the integral operation of any longitudinal or lateral sensor IV or IH is completed is checked based on the integration completion signal output from the CCD focus detection element 61 (step S305). If the integral operation of the longitudinal and lateral sensors IV and IH is not completed (step S305, N), the integration time for each sensor is stored in the built-in RAM 31b (step S307). Thereafter, it is determined whether or not the maximum integration time has lapsed (step S315). If the maximum integration time has not lapsed (step S315, N), it is determined whether or not the integral operations of all the sensors are completed (step S317). If the integral operations of all the longitudinal and lateral sensors IV and IH are not completed (step S317, N), control is returned to step S305.

If the integral operation of any longitudinal and lateral sensors is completed (step S305, Y), the integration completion information communication operation is carried out (step S309). If there is a sensor which is performing an integral operation, the integration time of the longitudinal or lateral sensor which is performing the integral operation is stored in the RAM 31b (step S313). Thereafter, control proceeds to step S315. If there is no longitudinal or lateral sensor which is performing the integral operation (step S311, N), control skips step S313 and proceeds to step S315.

The operations from step S305 to step S317 are repeated until either the integral operations of all the longitudinal and lateral sensors IV and IH are completed (step S317, Y), so that control exits from this loop and proceeds to step S321, or until the maximum integration time has lapsed before the integral operations of all the longitudinal and lateral sensors IV and IH are completed (step S315, Y), so that the Gain setting (gain-up setting) is carried out (step S319) and thereafter, control proceeds to step S321. The Gain setting is performed to set the amplification magnification of the signals output from the line sensor arrays.

At step S321, the integration completion communication is sent to the CCD focus detection element 61 to stop the integral operation of the CCD focus detection element 61. Subsequently, the video signal Video is input from the CCD focus detection element 61, is A/D-converted (step S323), and control is returned (RET).

<Defocus Amount Calculation>

Figure 6A:
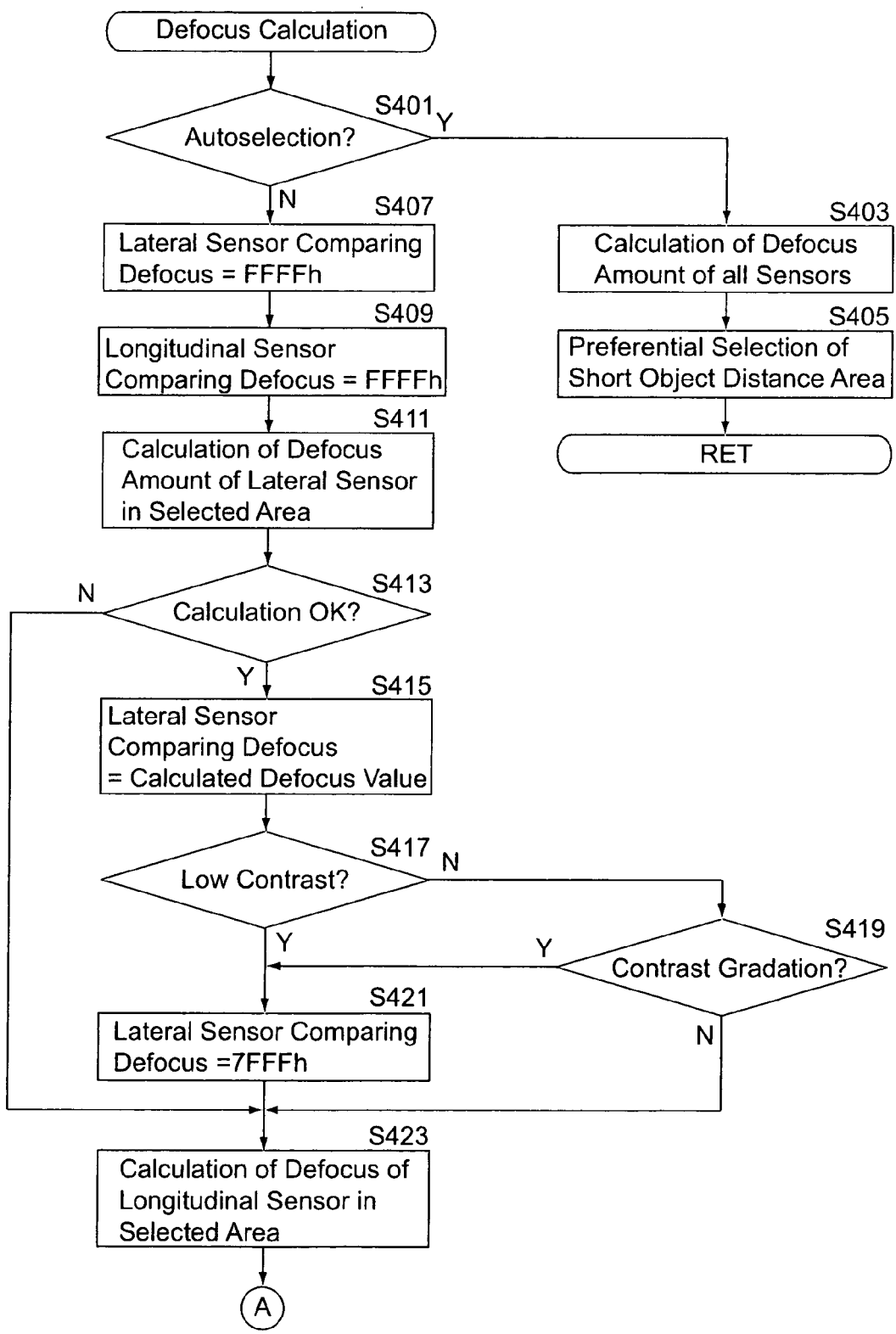
FIGS. 6A and 6B show a flow chart of a defocus calculation operation in the AF operation shown in FIG. 4.
Figure 6B:
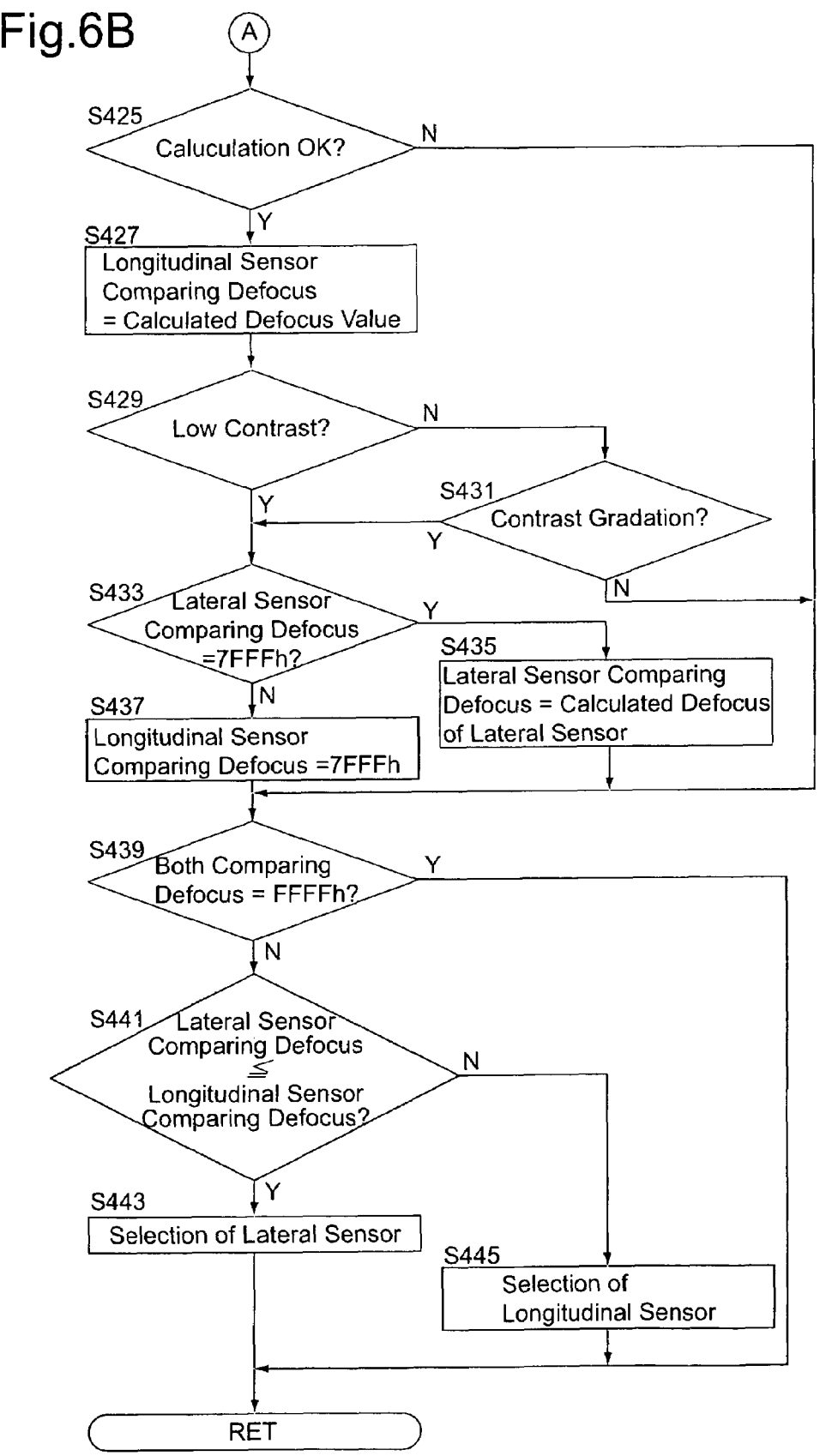

The defocus amount calculating operation which is carried out at step S207 subsequent to the integral operation (step S205) is explained with reference to the flow chart shown in FIGS. 6A and 6B.

In the defocus amount calculating operation, it is determined whether or not the autoselection mode to automatically select the focus detection sensors (focus detection areas) is selected (step S401). The autoselection mode can be selected in the mode selection operation per se known.

If the autoselection mode is selected (step S401, Y), the defocus amount is obtained by calculation for all the longitudinal and lateral sensors IV and IH (step S403). The defocus amount corresponding to the closest object distance is selected from among the effective defocus amounts, and control is returned (step S405; RET). To select the defocus amount, in general, the focus detection areas closer to the center have higher preference. For example, if the calculated defocus amounts are identical or within a predetermined range, the focus detection area closer to the center is preferentially selected.

If the autoselection mode is not selected (step S401, N), the operations from step S407 are carried out. First, the fail value FFFFh is set to the lateral sensor comparing defocus and the longitudinal sensor comparing defocus (steps S407, S409), and the defocus amount (absolute value) of the manually selected lateral sensor is calculated (step S411).

Subsequently, it is determined whether or not the effective calculation result is obtained (whether the calculation is OK) (step S413). If the effective calculation result is obtained, the lateral sensor comparing defocus is substituted with the effective defocus amount (absolute value) obtained by calculation (step S415), and it is determined whether the image data of the lateral sensor IH has a low contrast data or has a contrast gradation (steps S417, S419). If the contrast is low or (step S417, Y), or the contrast is not low but the image has a contrast gradation (step S417, N; S419, Y), the lateral sensor comparing defocus is substituted with the maximum value 7FFFh (step S421). If the contrast is not low (step S417, N) and the image has no contrast gradation (step S419, N), control jumps to step S423.

At step S423, the defocus amount (absolute value) is calculated for the longitudinal line sensor array of the selected area. If the effective defocus amount is obtained (calculation is OK) (step S425, Y), the longitudinal line sensor array comparing defocus is substituted with the calculated defocus amount (step S427) Thereafter, it is determined whether the image data of the longitudinal line sensor array represents low contrast (step S429).

If the contrast is low or (step S429, Y), or the contrast is not low (step S429, N) but the image has a contrast gradation (step S431, Y), it is determined whether the lateral sensor comparing defocus is identical to the maximum value 7FFFh (step S433). If the lateral sensor comparing defocus is identical to the maximum value 7FFFh (step S433, Y), the lateral sensor comparing defocus is substituted with the calculated value of the lateral sensor defocus (step S435). Namely, the maximum value 7FFFh which has been substituted because of the low contrast or contrast gradation is substituted with the calculated defocus amount (step S415). Note that the defocus amount calculated at step S411 is stored in the built-in RAM 31b. In the illustrated embodiment, the lateral sensor has a higher priority, so that the defocus of the lateral sensor is returned to the calculated value if the defocuses of the longitudinal and lateral sensors are both identical to 7FFFh. This is because, in general, lateral photographing is mainly conducted. If the lateral sensor comparing defocus is not identical to the maximum value 7FFFh (step S433, N), the longitudinal sensor comparing defocus is substituted with the maximum value 7FFFh (step S437), and control proceeds to step S439.

If the calculation of the longitudinal sensor defocus of the selected area is not valid (step S425, N), or the image data does not represent contrast gradation (step S431, N), control proceeds to step S439.

At step S439, it is determined whether the longitudinal and lateral sensor comparing defocuses are both identical to the fail value FFFFh. If the longitudinal and lateral sensor comparing defocuses are both identical to the fail value FFFFh (step S439, Y), control is returned (RET) because no valid defocus amount is obtained for the selected cross detection area. If the longitudinal sensor comparing defocus or the lateral sensor comparing defocus is not identical to the fail value FFFFh (step S439, N), it is determined whether or not the lateral sensor comparing defocus is below the longitudinal sensor comparing defocus (step S441). If it is determined that the lateral sensor comparing defocus is equal to or below the longitudinal sensor comparing defocus (step S441, Y), the lateral line sensor array is selected (step S443) and control is returned (RET). If the lateral sensor comparing defocus is not below the longitudinal sensor comparing defocus is checked (step S441, N), the longitudinal line sensor array is selected (step S445), and control is returned (RET). Namely, the defocus amount closer to the current position is selected.

In the above-mentioned operations, among the defocus amounts obtained by the longitudinal and horizontal sensors IV and IH of the selected cross detection area, the defocus amount whose absolute value is smaller is selected. Namely, the defocus amount corresponding to a smaller movement of the focusing lens group L1 from the current position is selected. Accordingly, the movement of the focusing lens can be minimized. Moreover, if the image data from the longitudinal and lateral sensors IV and IH represents a low contrast and contrast gradation, it is not selected since the defocus amount is substituted with the maximum value 7FFFh. Consequently, a more reliable image which is neither has a low contrast nor a contrast gradation is preferentially selected, thus resulting in fewer false operations.

Although, in the illustrated embodiment, the defocus amount of the lateral sensor is selected if the absolute values of the defocus amounts of the longitudinal and lateral sensors in the same cross detection area are identical, in an alternative embodiment, it is possible to select the defocus amount of the longitudinal sensor or the defocus amount on the shorter object distance side, or in another embodiment it is possible to select the defocus amount which requires the focusing lens to be moved in the same direction as the previous movement thereof. If the defocus amount on the shorter object distance side is selected, it is possible to place an object to be photographed in the wide distance range from the short distance within the depth of focus. If the defocus amount to move the focusing lens in the same direction as the previous movement is selected, the reliability in the focused state is enhanced especially when the autofocus system is previously out-of-focus, thus resulting in no occurrence of hunting.

According to the present invention, as the defocus amount having the smallest absolute value is selected from among the defocus amounts obtained from the detection zones of the intersecting detection areas, the movement of the focusing lens group can be minimized.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A multipoint autofocus system in which a pair of object images, obtained by pupil-division of an object light bundle in each detection area, are projected onto different zones of a sensor and are converted into image signals, so that a defocus amount can be determined based on the image signals, said multipoint autofocus system comprising:
   intersecting detection areas that partly overlap, a plurality of sensor arrays of said sensor corresponding to respective said intersecting detection areas; and
   a selection device configured for selecting a defocus amount whose absolute value is smallest out of defocus amounts obtained by each sensor array of said intersecting detection areas, the defocus amount representing an amount of movement required to bring a lens to an in focus condition.

2. The multipoint autofocus system according to claim 1, wherein said intersecting detection areas comprise two pairs of areas which intersect at a predetermined angle and two pairs of corresponding said sensor arrays.

3. The multipoint autofocus system according to claim 1, further comprising a reliability judging device for determining the reliability of said image signals obtained from said sensor arrays corresponding to said intersecting detection areas,
   wherein said selection device performs a selecting operation for a low-reliability defocus amount, corresponding to an intersecting detection area whose reliability has been judged to be low by said reliability judging device, and remaining defocus amounts, after said low-reliability defocus amount is substituted with a predetermined value.

4. The multipoint autofocus system according to claim 3, said reliability judging device being configured such that when the reliability of said image signals obtained from all said sensor arrays corresponding to said intersecting detection areas is low, said defocus amount is not substituted.

5. The multipoint autofocus system according to claim 3, wherein said reliability is determined based on whether the object images projected onto said sensor arrays has a low contrast or contrast gradation.

6. The multipoint autofocus system according to claim 1, wherein when one of said intersecting detection areas is selected, said selection device is configured to perform a selecting operation for the defocus amount obtained from the sensor array of the selected intersecting detection area.

7. The multipoint autofocus system according to claim 1, wherein when the absolute values of the defocus amounts are substantially identical or a difference between the absolute values of the defocus amounts is within a predetermined range, said selection device is configured to select the defocus amounts of said sensor arrays corresponding to lateral detection areas.

8. A multipoint autofocus system in which a pair of object images, obtained by pupil-division of an object light bundle transmitted through an optical system including a focusing lens group in each detection area, are projected onto different zones of a sensor and are converted into image signals, so that an amount of movement of said focusing lens group can be determined based on the image signals, said multipoint autofocus system comprising:
   intersecting detection areas that partly overlap, a plurality of sensor arrays of said sensor corresponding to respective said intersecting detection areas; and
   a selection device configured for selecting the smallest amount of movement of said focusing lens group, from among the movement amounts of said focusing lens group obtained by said sensor arrays corresponding to said intersecting detection areas.

9. A camera having a multipoint autofocus system in which a pair of object images, obtained by pupil-division of an object light bundle in each detection area, are projected onto different zones of a sensor and are converted into image signals, so that a defocus amount can be determined based on the image signals, said multipoint autofocus system comprising:
   intersecting detection areas that partly overlap, a plurality of sensor arrays of said sensor corresponding to respective said intersecting detection areas; and
   a selection device configured for selecting a defocus amount whose absolute value is smallest out of defocus amounts obtained by each sensor array of said intersecting detection areas, the defocus amount representing an amount of movement required to bring a lens to an in focus condition.

10. A camera having a multipoint autofocus system in which a pair of object images, obtained by pupil-division of an object light bundle transmitted through an optical system including a focusing lens group in each detection area, are projected onto different zones of a sensor and are converted into electrical image signals, so that an amount of movement of said focusing lens group can be determined based on the image signals, said multipoint autofocus system comprising:
   intersecting detection areas that partly overlap, a plurality of sensor arrays of said sensor corresponding to respective said intersecting detection areas; and
   a selection device configured for selecting the smallest amount of movement of the focusing lens group, from among the movement amounts of said focusing lens group obtained by said sensor arrays corresponding to said intersecting detection areas.

11. The multipoint autofocus system according to claim 8, further comprising a reliability judging device for determining the reliability of said image signals obtained from said sensor arrays corresponding to said intersecting detection areas,
   wherein said selection device performs a selecting operation for a low-reliability defocus amount, corresponding to an intersecting detection area whose reliability has been judged to be low by said reliability judging device, and remaining defocus amounts, after said low-reliability defocus amount is substituted with a predetermined value.

12. The multipoint autofocus system according to claim 11, wherein said reliability judging device being configured such that when the reliability of said image signals obtained from all said sensor arrays corresponding to said intersecting detection areas is low, said defocus amount is not substituted.

13. The multipoint autofocus system according to claim 11, wherein said reliability is determined based on whether the object images projected onto said sensor arrays has a low contrast or contrast gradation.

14. The camera having a multipoint autofocus system according to claim 9, further comprising a reliability judging device for determining the reliability of said image signals obtained from said sensor arrays corresponding to said intersecting detection areas,
   wherein said selection device performs a selecting operation for a low-reliability defocus amount, corresponding to an intersecting detection area whose reliability has been judged to be low by said reliability judging device, and remaining defocus amounts, after said low-reliability defocus amount is substituted with a predetermined value.

15. The camera having a multipoint autofocus system according to claim 14 said reliability judging device being configured such that when the reliability of said image signals obtained from all said sensor arrays corresponding to said intersecting detection areas is low, said defocus amount is not substituted.

16. The camera having a multipoint autofocus system according to claim 14, wherein said reliability is determined based on whether the object images projected onto said sensor arrays has a low contrast or contrast gradation.

17. The camera having a multipoint autofocus system according to claim 10, further comprising a reliability judging device for determining the reliability of said image signals obtained from said sensor arrays corresponding to said intersecting detection areas,
   wherein said selection device performs a selecting operation for a low-reliability defocus amount, corresponding to an intersecting detection area whose reliability has been judged to be low by said reliability judging device, and remaining defocus amounts, after said low-reliability defocus amount is substituted with a predetermined value.

18. The camera having a multipoint autofocus system according to claim 17, said reliability judging device being configured such that when the reliability of said image signals obtained from all said sensor arrays corresponding to said intersecting detection areas is low, said defocus amount is not substituted.

19. The camera having a multipoint autofocus system according to claim 17, wherein said reliability is determined based on whether the object images projected onto said sensor arrays has a low contrast or contrast gradation.

20. The camera having a multipoint autofocus system according to claim 10, wherein said intersecting detection areas comprise two pairs of areas which intersect at a predetermined angle and two pairs of corresponding said sensor arrays.

* * * * *